United States Patent
Khalid

(10) Patent No.: US 11,646,935 B1
(45) Date of Patent: May 9, 2023

(54) AUTOMATED PROVISIONING AND CONFIGURATION FOR DYNAMICALLY LOADED NFV- AND SDN-BASED NETWORKS

(71) Applicant: Charter Communications Operating, LLC, St. Louis, MO (US)

(72) Inventor: Saran Khalid, Denvor, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/540,542

(22) Filed: Dec. 2, 2021

(51) Int. Cl.
| | |
|---|---|
| *G06F 15/16* | (2006.01) |
| *H04L 41/0806* | (2022.01) |
| *H04L 45/586* | (2022.01) |
| *H04L 45/64* | (2022.01) |
| *H04L 41/08* | (2022.01) |
| *H04L 41/084* | (2022.01) |
| *H04L 43/08* | (2022.01) |
| *H04L 41/0213* | (2022.01) |

(52) U.S. Cl.
CPC ........ *H04L 41/0806* (2013.01); *H04L 41/084* (2013.01); *H04L 41/0886* (2013.01); *H04L 45/586* (2013.01); *H04L 45/64* (2013.01); *H04L 41/0213* (2013.01); *H04L 43/08* (2013.01)

(58) Field of Classification Search
CPC ............... H04L 41/0806; H04L 41/084; H04L 41/0886; H04L 45/586; H04L 45/64; H04L 41/0213; H04L 43/08
See application file for complete search history.

(56) References Cited

U.S. PATENT DOCUMENTS

| | | | | |
|---|---|---|---|---|
| 9,843,624 | B1* | 12/2017 | Taaghol | H04L 41/0803 |
| 2015/0200838 | A1* | 7/2015 | Nadeau | H04L 45/02 |
| | | | | 370/254 |
| 2016/0094398 | A1* | 3/2016 | Choudhury | H04L 45/42 |
| | | | | 370/254 |
| 2017/0329639 | A1* | 11/2017 | Morper | G06F 9/5038 |

(Continued)

FOREIGN PATENT DOCUMENTS

WO    WO-2022104396 A1 *   5/2022

*Primary Examiner* — Ario Etienne
*Assistant Examiner* — Thorne E Waugh
(74) *Attorney, Agent, or Firm* — Mendelsohn Dunleavy, P.C.; Steve Mendelsohn

(57) ABSTRACT

A network controller for a mesh network of routers in a communication system. The network controller automatically monitors the mesh network; determines to add one or more new software-based routers to the mesh network; provisions one or more programmable resources to be the one or more new software-based routers in the mesh network; and configures the one or more new software-based router to support one or more new paths through the mesh network. In some implementations, the controller automatically accesses one or more corresponding OEM libraries to retrieve one or more configuration protocols for the one or more programmable resources and uses the one or more retrieved configuration protocols to provision the one or more programmable resources using NFV and SDN technologies and configure the one or more new software-based routers. The controller may also automatically decommission one or more existing software-based routers from the network when appropriate.

30 Claims, 5 Drawing Sheets

(56) References Cited

U.S. PATENT DOCUMENTS

| | | | |
|---|---|---|---|
| 2018/0024537 A1* | 1/2018 | Chauvet | G06F 9/5005 |
| | | | 718/104 |
| 2018/0054772 A1* | 2/2018 | Tan | H04W 40/12 |
| 2018/0199218 A1* | 7/2018 | Ashrafi | H04W 84/18 |
| 2018/0343567 A1* | 11/2018 | Ashrafi | H04L 43/08 |
| 2020/0204492 A1* | 6/2020 | Sarva | H04L 45/38 |
| 2020/0296155 A1* | 9/2020 | McGrath | G06F 9/5027 |
| 2020/0314015 A1* | 10/2020 | Mariappan | H04L 41/0895 |
| 2020/0336376 A1* | 10/2020 | Mahdi | G06N 5/04 |
| 2021/0168029 A1* | 6/2021 | Mathieu | H04L 41/00 |

\* cited by examiner

FIG. 1     100

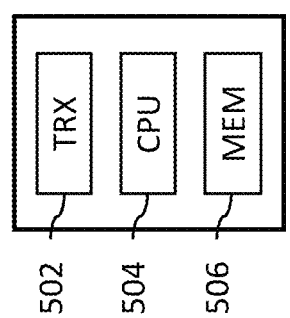

AUTOMATED PROVISIONING AND CONFIGURATION FOR DYNAMICALLY LOADED NFV- AND SDN-BASED NETWORKS

BACKGROUND

Field of the Disclosure

The present disclosure relates to communication networks and, more specifically but not exclusively, to mesh networks for concurrently routing communications signals between multiple pairs of end nodes.

Description of the Related Art

This section introduces aspects that may help facilitate a better understanding of the disclosure. Accordingly, the statements of this section are to be read in this light and are not to be understood as admissions about what is prior art or what is not prior art.

Certain conventional mesh networks for concurrently routing communications signals between multiple pairs of end nodes comprise a set of configurable hardware-based routers interconnected by links such that one or more configurable paths (aka routes) are available between any two end nodes. To accommodate a system load comprising a set of communications between multiple pairs of end nodes, the routers are configured such that each communication between a pair of end nodes traverses the mesh network along a path comprising two or more links and one or more routers. The paths are selected such that the system load is distributed in a way that enables each configured router and each corresponding link in the mesh network to support the corresponding portion of the overall system load. If and when the system load increases due to increases in the bandwidth of existing communications and/or the addition of new communications, the existing routers may need to be re-configured to add new paths and/or modify existing paths to accommodate the increased load. If and when the system load increases significantly, it may also be necessary to add new routers and new links to the mesh network to support the increased system load. In a conventional mesh network, the provisioning of new hardware-based routers and new hardwire links is a manual task that involves one or more individuals physically adding the new hardware-based routers and the new links to the existing mesh network. After being added to the mesh network, the new routers may then be configured to handle some of the increased system load.

SUMMARY

Problems in the prior art are addressed in accordance with the principles of the present disclosure by employing network function virtualization (NFV) and software-defined networking (SDN) technologies to provision a mesh network using software-based routers, where a software-based router is a multi-functional programmable node, such as a personal computer (PC) or other suitable programmable device, that can be programmed based on a suitable SDN technology to function, among other possible functions, as a router capable of being configured (i.e., programmed) to receive communication signals from one or more other software- and/or hardware-based routers of a mesh network based on a suitable NFV technology and to transmit those communications signals to one or more other software- and/or hardware-based routers of that mesh network. In general, an NFV-based mesh network of the present disclosure has a plurality of SDN software-based routers interconnected as part of a mesh topology analogous to the mesh topology of a convention mesh network having only hardware-based routers. Note that an NFV-based mesh network of the present disclosure may also have one or more hardware-based routers interconnected with each other and/or with one or more of the software-based routers. Note further that the software- and hardware-based routers of an NFV-based mesh network may communicate via hardwire links or wireless links or both.

According to the present disclosure, as the system load changes, the existing software-based routers and any existing hardware-based routers in the NFV-based mesh network can be re-configured to accommodate the load changes. Furthermore, if the system load increases such that new routers need to be added to the NFV-based mesh network, then new software-based routers can be automatically added to the NFV-based mesh network without having to manually provision new hardware.

As used herein, with respect to software-based routers, the term "provision" refers to the process of programming a suitable programmable device to function as a router in a mesh network, the terms "un-provision," "decommission," and "deprogram" refer to the process of removing a software-based router from a mesh network. As used herein, with respect to both software-based and hardware-based routers, the term "configure" refers to the process of programming or otherwise ensuring that a router supports one or more particular paths through the mesh network.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 5 is a simplified hardware block diagram of a generic node that can be used to implement any of the nodes of the communication system of FIG. 1 such as the network controller.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
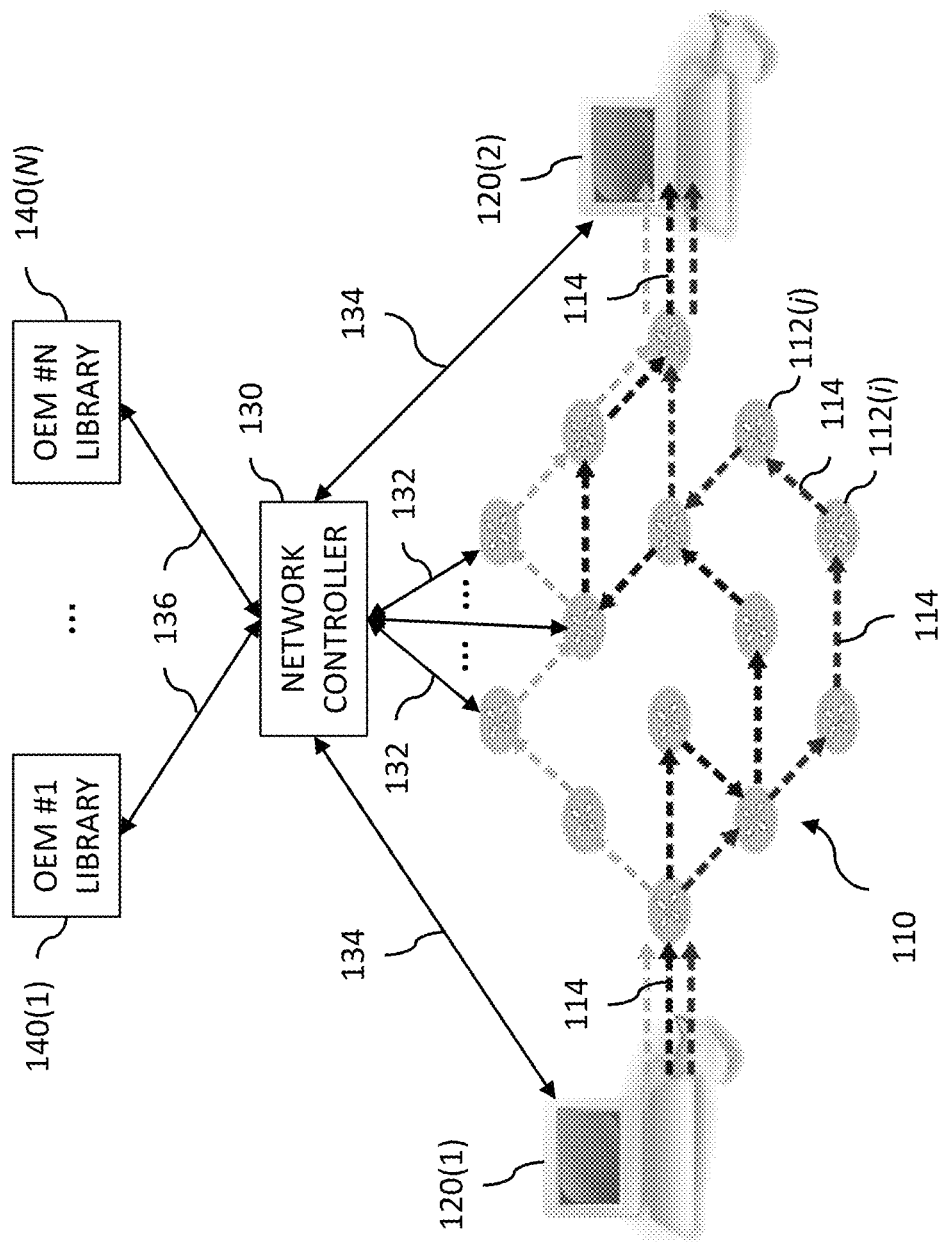
FIG. 1 is a high-level block diagram of an example communication system of the present disclosure.

FIG. 1 is a high-level block diagram of an example communication system 100 of the present disclosure. Communication system 100 has an NFV-based mesh network 110 having routers 112 interconnected by mesh links 114, where the mesh network 110 enables communication signals to be transmitted from one end node 120(1) to another end node 120(2) via a particular path consisting of one or more routers 112 and two or more mesh links 114. Although FIG. 1 shows only a single pair of end nodes 120(1) and 120(2) communicating via a simple mesh network 110, those skilled in the art will understand that mesh networks may involve many routers 112 interconnected by many mesh links 114 to support concurrent communications between many different pairs of end nodes 120 over many different paths.

The mesh network 110 is controlled by a network controller 130 that automatically manages, via (wireless or wireline) control links 132, the configurations of the routers 112 to support particular paths through the mesh network 110. The network controller 130 communicates with the end nodes 120 via (wireless or wireline) communication links 134 to determine the end nodes' bandwidth needs through the mesh network 110. Depending on the particular implementation, zero, one, or more of the mesh links 114 may be wireless links and zero, one, or more of the mesh links 114 may be wireline links.

Depending on the particular implementation, two or more of the routers 112 in the mesh network 110 are software-based routers and zero, one, or more of the routers 112 are conventional hardware-based routers, where the software-based routers 112 are manufactured by two or more different OEMs (original equipment manufacturers) that have different sets of commands used for configuring their routers. For example, router 112(i) may be a software-based router from a first OEM, while router 112(j) may be a software-based router from a second OEM, where the configuration commands for the two software-based routers 112(i) and 112(j) are different. As shown in FIG. 1, in order to be able to configure software-based routers 112 from different OEMs, the network controller 130 is able to communicate via communication links 136 with libraries 140(1)-140(N) of configuration commands maintained by the N different OEMs in order to access information about those configuration commands needed by the network controller 130 to provision and configure the software-based routers 112 of each different OEM. In some implementations, the communication links 136 are—or at least involve—the Internet.

When the network controller 130 determines that the existing mesh network 110 is not able to handle an increasing system load of communication traffic, the network controller 130 is able automatically to program (i.e., provision) one or more additional devices referred to herein as programmable resources (not shown in FIG. 1) to become new software-based routers 112 in the mesh network 110. The network controller 130 can configure those new software-based routers 112 and re-configure any previously existing hardware- or software-based routers 112 as needed to support the additional system load while continuing to handle the previously existing system load. This configuration processing will include the establishment of new paths through the newly added software-based routers 112 in the augmented mesh network 110 and possibly the re-routing of some of the previously existing system load to modified paths in the augmented mesh network 110.

Figure 2:
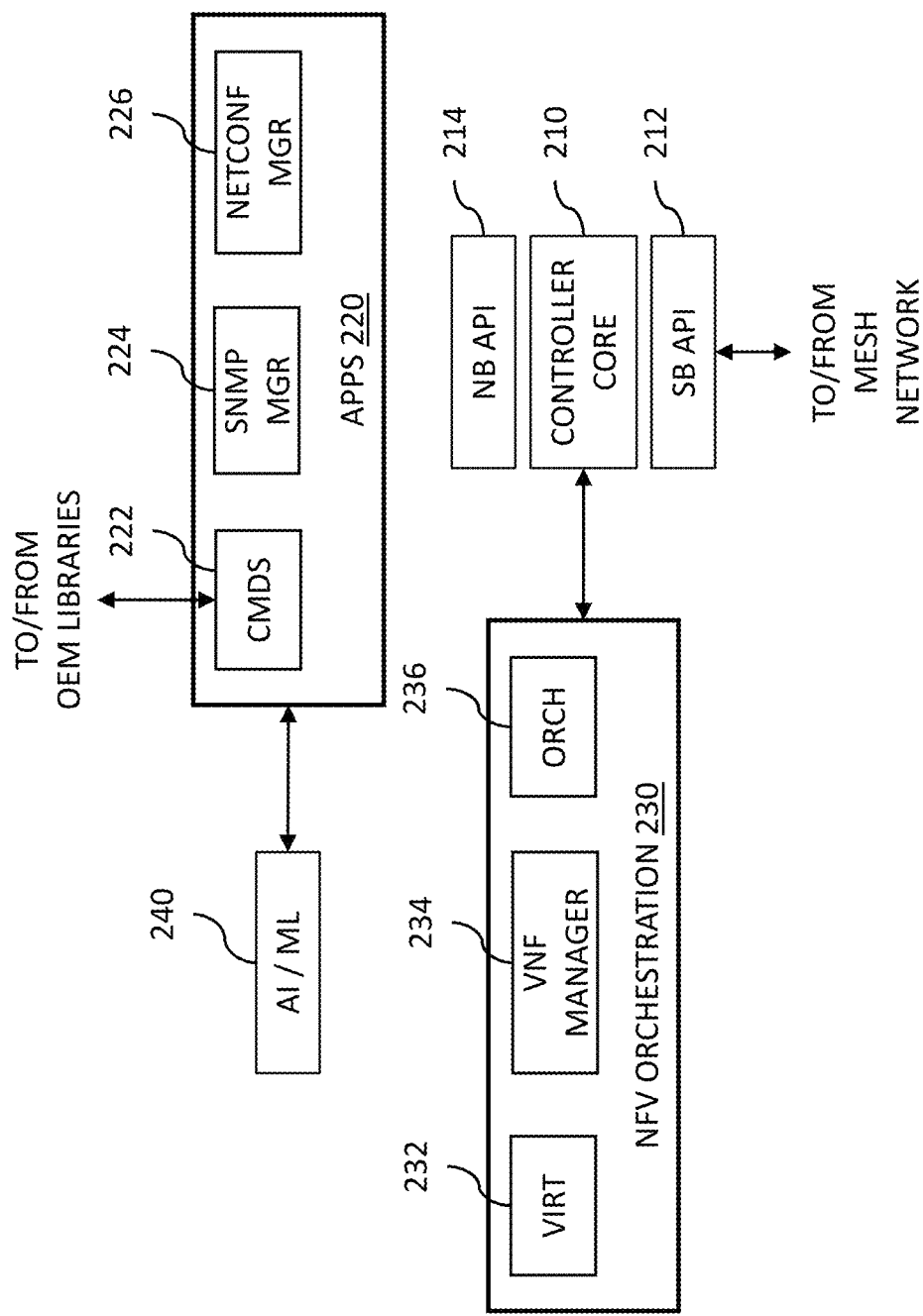
FIG. 2 is a simplified block diagram showing some of the software elements implemented by the network controller of FIG. 1.

FIG. 2 is a simplified block diagram showing some of the software elements implemented by the network controller 130 of FIG. 1. As represented in FIG. 2, the network core 210 communicates with the end nodes 120 and the routers 112 of the mesh network 110 of FIG. 1 via the southbound (SB) application programming interface (API) 212 to perform the traditional control functions for a mesh network, such as (without limitation) connection establishment, connection management, route selection, and route defining. In addition, the network core 210 communicates with certain applications (apps) 220 via the northbound (NB) API 214 and with the NFV orchestration 230 to perform the functions of the present disclosure associated with the automatic provisioning and configuring of available programmable resources from a pool to be new software-based routers 112 in the mesh network 110, when needed to support increasing network traffic demands, as well as the automatic decommissioning and return of existing software-based routers 112 to the pool of available programmable resources, when those routers are no longer needed to support decreasing network traffic demands.

In particular, the NFV orchestration 230 is used to provision the programmable resources as software-based routers 112 conforming to the NFV and SDN technologies, where the orchestration 236 translates business/technical requirements into technical changes/configurations that will be implemented in the mesh network 110, the VNF manager 234 manages the hardware, software, and licenses associated with the VNF technology, and the virtualization 232 stores information for the virtualized devices for different slices/network components.

The commands (CMDS) app 222 is used to retrieve the configuration protocols from the OEM libraries 140 of FIG. 1 that are used to provision and configure programmable resources as new software-based routers 112, the Network Configuration (NETCONF) manager 226 is used to push the configuration settings to the routers 112, and the Simple Network Management Protocol (SNMP) manager 224 implements the network management and network monitoring algorithm used to collect information about the routers 112 including the existing configurations on the routers 112 and status of their interfaces.

As shown in FIG. 2, although not required, in some implementations, the network controller 130 also implements artificial intelligence/machine learning (AI/ML) 240 to assist in its operations. Such AI/ML processing may be used to keep track of previously configured paths through the mesh network 110 for possible re-use in supporting newly added network traffic.

Figure 3:
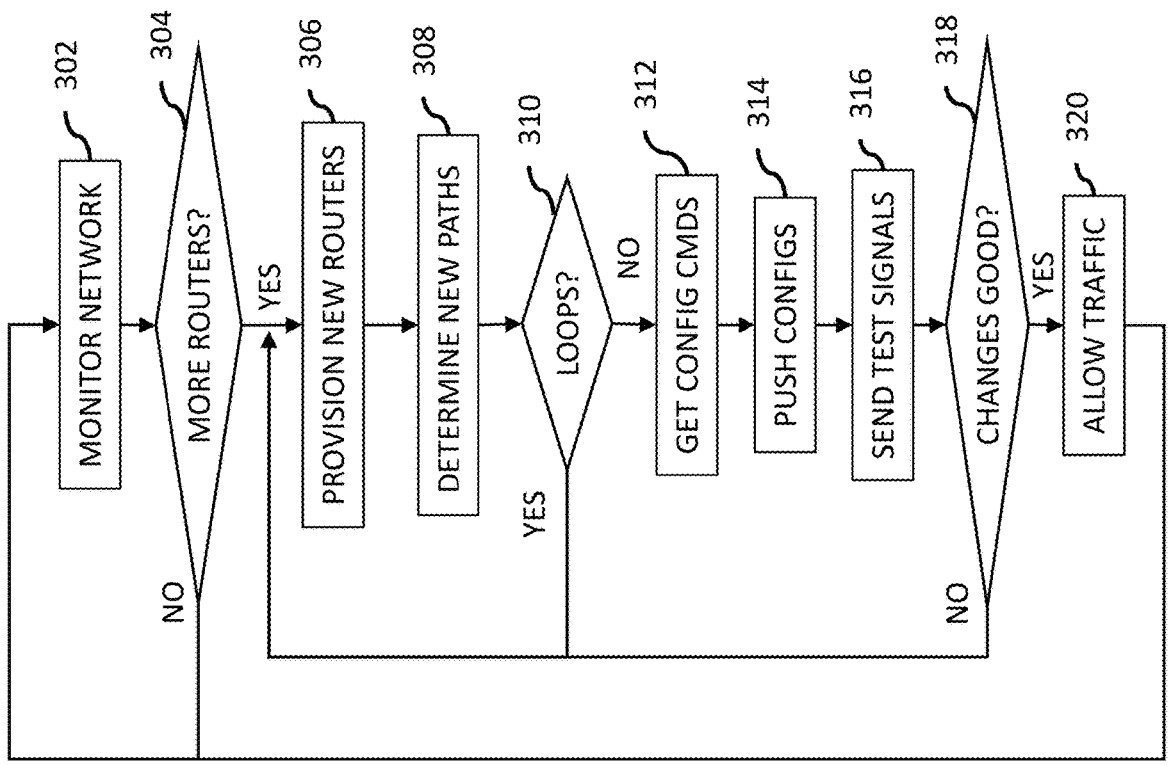
FIG. 3 is a flow diagram of the processing implemented by the network controller of FIG. 1 to add one or more software-based routers to the mesh network, according to certain embodiments of the disclosure.

FIG. 3 is a flow diagram of the processing implemented by the network controller 130 of FIG. 1 to add one or more new software-based routers 112 to the mesh network 110, according to certain embodiments of the disclosure.

In step 320, the SNMP manager 224 of the network controller 130 monitors the status of the mesh network 110 by receiving and processing information from the end nodes 120 via links 134 and from the routers 112 via links 132. The network monitoring of step 320 involves querying the routers 112 and end nodes 120 for performance, CPU usage, loading, etc., and monitoring dynamic network changes such as surges in demand, looking for better paths to prioritize certain traffic to meet the QoS demand, etc. Although not explicitly represented in FIG. 1, in typical implementations, the communication system 100 will have a number of port monitors distributed throughout the mesh network 110, where the port monitors (i) monitor the traffic at the different network interfaces of the routers 112 and end nodes 120 and (ii) feed corresponding traffic information back to the network controller 130 for use in performing the network monitoring of step 320. Various network thresholds are measured using traps, and the information is shared via master information blocks (MIBs). MIBs and traps are a part of the standard SNMP protocol, and the routers 112 are polled by SNMP agents (implemented either at the routers or at port monitors associated with those routers) for their status and current configuration, as needed. Routers 112 have specific settings/configurations to define certain flows. If the network controller 130 determines that a path should be changed, the network controller 130 will need current configurations of the corresponding routers 112 which the network controller 130 can determine using the SNMP protocol.

In step 304, the network controller 130 determines whether one or more new software-based routers 112 need to be added to the mesh network 110. The network controller 130 makes this determination based on the information received from the SNMP agents. If the network controller 130 determines in step 304 that no new software-based routers 112 need to be added to the mesh network 110, then processing returns to step 320 to continue monitoring the network. If the network controller 130 determines in step 304 that one or more new software-based routers 112 need to be added to the mesh network 110, then processing continues to step 306.

In step 306, the network controller 130 automatically provisions one or more new software-based routers 112 into the existing mesh network 110 by programming one or more multi-functional programmable resources to function as configurable routers in the mesh network 110. This processing is based on the information available at the SNMP manager 224 as well as the overall network view of the NFV/SDN-based infrastructure at the NFV orchestration 230.

In some implementations, a communications company maintains pools of available programmable resources in different geographical regions, where those resources are available to be programmed as software-based routers 112 in the mesh network 110 to support specific communication demands. As described below in the context of FIG. 4, if and when the network controller 130 determines that those communication demands have diminished, the network controller 130 can automatically "un-provision" (i.e., decommission) one or more of the existing software-based routers 112 such that the corresponding programmable resources can be returned to the pool to be available for future provisioning as part of the same or a different mesh network. Note that, in some implementations, if the pool of available resources gets depleted without satisfying all of the communication demands, then the network controller 130 will notify the network administrator that additional hardware-based routers may need to be manually provisioned in the mesh network 110.

As described above, using the commands app 222, the network controller 130 is able to retrieve configuration protocols as needed for the various programmable resources from libraries 140 maintained by the OEMs of those programmable resources.

In step 308, the network controller 130 determines how to modify the previous configuration of the now-augmented mesh network 110 including determining one or more new paths through the newly added software-based routers 112 to accommodate the additional system load. The network controller 130 will determine the best routes or alternatively where routing resources could be increased to meet the demand for a given section of a network to avoid congestion, etc. The network controller 130, which is aware of the settings on the previously existing routers 112, will determine the best paths based on the learnings of the past of optimum paths determined using suitable routing and/or traffic protocols. The network controller 130 determines the configurations to be implemented based on artificial intelligence/machine learning (AI/ML) (240 of FIG. 2) and mapping of conditions to configurations.

In step 310, the network controller 130 determines whether any loops exist in any of the modified or new paths determined in step 308. As understood by those skilled in the art, a loop occurs when signals get transmitted via a path that at least partially closes in on itself within a mesh network. For example, consider the path from end node 120(1) to end node 120(j) consisting of routers 112(1), 112(2), and 112(3) (not indicated in FIG. 1), where end node 120(1) transmits to router 112(1), which transmits to router 112(2), which transmits to router 112(3), which transmits to end node 120(j). If router 112(3) is a wireless router that broadcasts signals wirelessly, it is possible that, in addition to transmitting signals to end node 120(j), router 112(3)'s wireless signals may also be received by router 112(1), in which case, router 112(1) will transmit those same signals to router 112(2), which will transmit those same signals to router 112(3), which will again broadcast those signals wirelessly to end node 120(j) and to router 112(1). End node 120(j) will typically recognize that it already received a copy of those signals and ignore the second copy of those same signals. Unfortunately, router 112(1), which is typically a passive router, will not make such a determination. As a result, routers 112(1)-112(3) will continue to transmit copies of that same signal over and over again, resulting in an inefficient use of mesh network bandwidth that could be used to support additional system load. With the configuration information as well as the overall network view available, the network controller 130 can identify where looping can occur.

If the network controller 130 determines in step 310 that one or more loops exist, then processing returns to step 306 to determine whether a different set of new routers should be provisioned and then to step 308 to determine a different set of new paths. In some implementations, an appropriate protocol, for example, a spanning-tree protocol can then be implemented in step 308 to block certain device interfaces to avoid looping. If the network controller 130 determines in step 310 that there are no loops, then processing proceeds to step 312.

In order to avoid disruptions to existing network traffic, the processing of step 308 typically and preferably maintains the previously existing paths for that previously existing network traffic. As such, steps 312-318 are typically and preferably implemented only for the newly added software-based routers 112. If any of the new paths determined in step 308 do involve any of the previously existing routers 112, then those routers 112 may also need to be taken into account when performing steps 312-318.

In step 312, the network controller 130 generates the configuration commands necessary to configure the routers 112 in the augmented mesh network 110 to support the paths determined in step 308. In some implementations, the network controller 130 will consult the NFV manager 234 of FIG. 2 for configuration settings which will be used by the NETCONF manager 226 to configure the routers 112 using Yet Another Next Generation (YANG) models. In step 312, as needed, the network controller 130 retrieves configuration command protocols for one or more software-based routers 112 and, if necessary, for one or more hardware-based routers, from the appropriate OEM libraries 140, depending on the manufacturers of those routers.

In step 314, the network controller 130 configures the routers 112 for the paths involving the newly added software-based routers 112. Note that this might involve re-configuring some of the previously existing routers 112 if they are part of any paths involving any of the newly added software-based routers 112 as long as that re-configuring does not interfere with any of the previously existing network traffic involving those same routers 112. In some implementations, the NETCONF manager 226 pushes onto the routers 112 the new configurations which were determined based on the AI/ML-determined configurations for optimum network performance.

In step 316, the network controller 130 sends test signals over the newly configured paths to make sure that those paths are able to handle the desired traffic. For example, the network controller 130 may provide a set of predefined communication signals to end node 120(1) to be transmitted to end node 120(2) over a newly configured path through the augmented mesh network 110. The network controller 130 will then receive those communication signals from end node 120(2) and compare those received communication signals to the set of predefined communication systems to determine whether the path is functioning properly.

If the network controller 130 determines in step 318 that one or more of the newly configured paths are not functioning properly, then processing returns to step 306 to determine whether a different set of new routers should be provisioned and then to step 308 to determine replacements for those non-functioning paths and, if necessary, for one or more other paths. If, however, the network controller 130 determines in step 318 that the newly configured paths are operating properly and that therefore the changes to the mesh network 110 are acceptable, then processing proceeds to step 320, where the newly configured paths are released for on-line use with real user traffic. Processing then returns to step 320 to continue monitoring the now-augmented mesh network 110.

Figure 4:
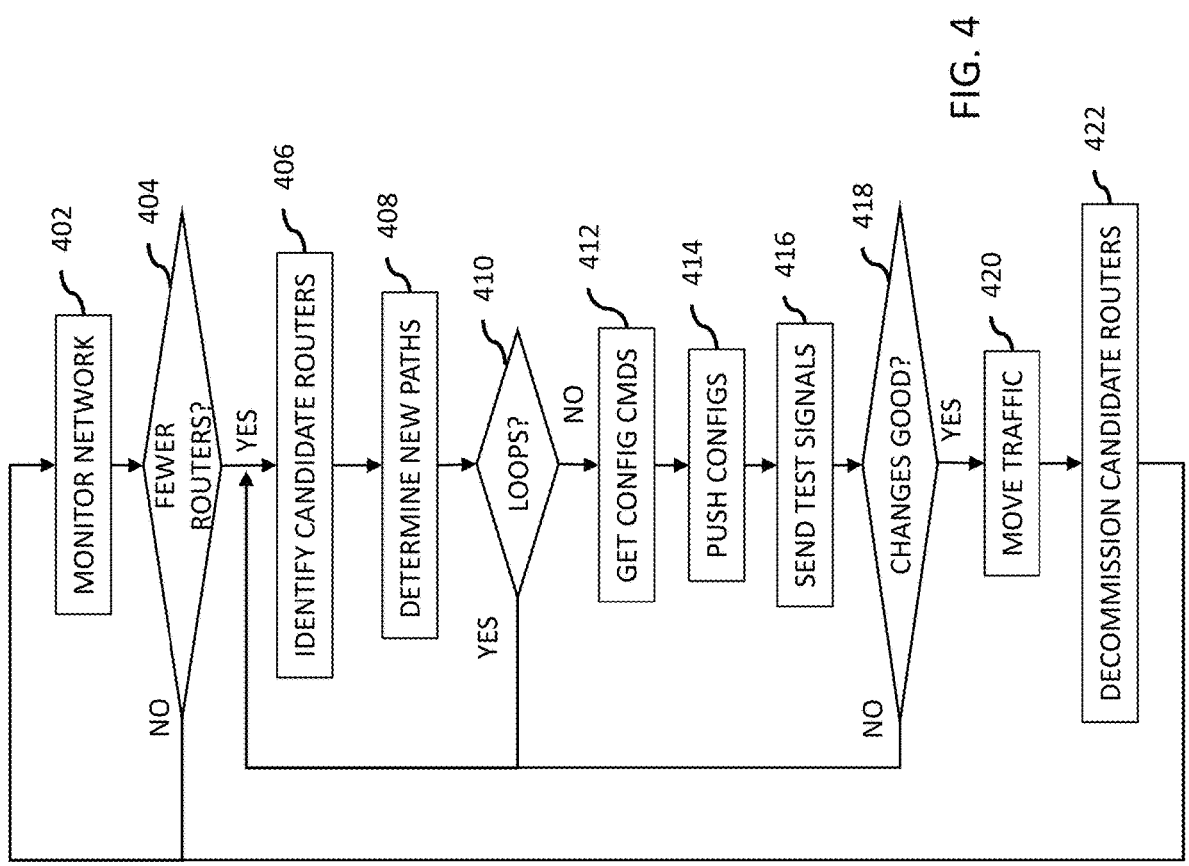
FIG. 4 is a flow diagram of the processing implemented by the network controller of FIG. 1 to remove one or more software-based routers from the mesh network, according to certain embodiments of the disclosure.

FIG. 4 is a flow diagram of the processing implemented by the network controller 130 of FIG. 1 to remove one or more software-based routers 112 from the mesh network 110, according to certain embodiments of the disclosure. With a few exceptions as noted below, the processing involved in the steps of removing existing software-based routers 112 in the method of FIG. 4 is similar to and even identical to the processing in the steps of adding new software-based routers 112 in the method of FIG. 3.

In step 402, the network controller 130 monitors the status of the mesh network 110 in the same manner as in step 320 of FIG. 3. In fact, step 402 of FIG. 4 and step 320 of FIG. 3 can be considered to be the same step since, at any given time, one of three different situations exists: (i) one or more existing software-based routers 112 can be removed from the mesh network 110, (ii) one or more new software-based routers 112 need to be added to the mesh network 110, or (iii) the existing software-based routers 112 in the mesh network 110 are appropriate for the current network traffic load.

In step 404, the network controller 130 determines whether one or more of the existing software-based routers 112 in the mesh network 110 are no longer needed to support the current network traffic load. Such a determination may be based on one or more of the following: optimization algorithms, reduction in demand, return of the network to its previous state, reduced network stress, and changes in traffic patterns. The monitoring of network traffic over time enables the network controller 130 to make these determinations based on traffic trends. If so, the processing proceeds to step 406; otherwise, processing returns to step 402 to continue to monitor the mesh network 110.

In step 406, the network controller 130 identifies one or more existing software-based routers 112 to be candidates for decommissioning. There are various devices, algorithms, and softwares installed in the network to determine the load on various network devices. If the trend is continuously downwards, then certain software-based routers may be able to be returned to the pool of programmable resources.

Steps 408-418 are analogous to steps 308-318 of FIG. 3, where, instead of determining and testing new configured paths in the newly augmented mesh network 110, new configured paths are determined and tested using analogous processing in the potentially reduced mesh network 110 (i.e., without using the one or more candidate software-based routers 112 identified in step 406). In some implementations, the reduction of the mesh network 110 may simply involve decommissioning the previously added software-based routers 112 and returning the mesh network 110 to its previous state. In that case, steps 408-422 might not be needed to be implemented.

If the network controller 130 determines in step 418 that the new configured paths in the potentially reduced mesh network 110 are appropriate, then processing proceeds to step 420, where the real user network traffic is moved away from the one or more candidate software-based routers 112 identified in step 406 and onto those new configured paths. In step 422, those candidate software-based routers 112 are decommissioned (i.e., deprogrammed) and returned to the network pool of available programmable resources. Processing then returns to step 402 to monitor the newly reduced mesh network 110.

FIG. 5 is a simplified hardware block diagram of a generic node 500 that can be used to implement any of the nodes of the communication system 100 of FIG. 1 such as the network controller 130. As shown in FIG. 5, the node 500 includes (i) suitable communication hardware (e.g., wireless, wireline, and/or optical transceivers (TRX)) 502 that supports communications with other nodes, (ii) at least one processor (e.g., CPU microprocessor) 504 that controls the operations of the node 500, e.g., by implementing the software architecture shown in FIG. 2, and (iii) a memory 506 that stores code executed by the processor C04 and/or data generated and/or received by the node 500.

In certain embodiments, the present disclosure is a network controller for a mesh network of routers in a communication system, the network controller comprising a processor and memory configured to store program code for the processor, such that, when the processor executes the program code, the network controller automatically monitors the mesh network; determines to add one or more new software-based routers to the mesh network; provisions one or more programmable resources to be the one or more new software-based routers in the mesh network; and configures the one or more new software-based router to support one or more new paths through the mesh network.

In at least some of the above embodiments, the controller automatically accesses one or more corresponding OEM libraries to retrieve one or more configuration protocols for the one or more programmable resources and uses the one or more retrieved configuration protocols to provision the one or more programmable resources and configure the one or more new software-based routers.

In at least some of the above embodiments, the controller automatically adds the one or more new software-based routers to the mesh network without interrupting existing communications being supported by the mesh network.

In at least some of the above embodiments, the controller automatically sends test communication signals via the one or more new paths through the mesh network without interrupting the existing communications and allows the one or more new paths to support on-line communications after determining that transmission of the test communication signals was successful.

In at least some of the above embodiments, the controller accesses a pool of programmable resources available to be provisioned and configured as the one or more new software-based routers in the mesh network.

In at least some of the above embodiments, the controller further automatically determines to remove one or more existing software-based routers from the mesh network and decommissions the one or more existing software-based routers.

In at least some of the above embodiments, the controller provisions the one or more programmable resources as the one or more new software-based routers using NFV and SDN technologies.

In at least some of the above embodiments, the controller monitors the mesh network using SNMP technology.

In at least some of the above embodiments, the controller configures the one or more software-based routers using NETCONF technology.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Also for purposes of this disclosure, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods

What is claimed is:

1. A network controller for a mesh network of network devices in a communication system, the network controller comprising a processor, storage, and memory configured to store program code for the processor, such that, when upon the processor ewes executing the program code, the processor implements (i) a controller core, (ii) a northbound application programming interface (API) that enables the network controller to interact with a plurality of applications, (iii) a southbound API that enables the network controller to communicate with the network devices in the mesh network, (iv) the plurality of applications, and (v) a network function virtualization (NFV) orchestration, wherein the controller core is configured to automatically:
monitor, via the northbound API, the mesh network using a network management application to collect information about the network devices including existing configurations on the network devices and status of their interfaces to determine whether the mesh network has sufficient resources;
determine to add at least first and second new software-based network devices to the mesh network when upon the controller core determines determining that the mesh network has insufficient resources;
communicate, via the southbound API, with a commands application to download, from at least first and second different original equipment manufacturer (OEM) libraries, at least first and second configuration protocols for at least first and second different programmable resources manufactured by the at least first and second different OEMs, respectively, on virtualized devices supervised by a virtualization module;
provision, (i) using, via the southbound API, the network management application and a network configuration application and (ii) using the NFV orchestration, the at least first and second programmable resources to be the at least first and second new software-based network devices in the mesh network based on the at least first and second configuration protocols, respectively, to form an augmented mesh network; and
configure, via the first API, the at least first and second new software-based network devices to support one or more new paths through the augmented mesh network.

2. The controller of claim 1, wherein the controller is configured to automatically add the at least first and second new software-based network devices to the mesh network without interrupting existing communications being supported by the mesh network.

3. The controller of claim 2, wherein the controller is configured to automatically:
send test communication signals via the one or more new paths comprising at least one new software-based network device through the mesh network without interrupting the existing communications; and
allow the one or more new paths to support on-line communications after determining that transmission of the test communication signals was successful.

4. The controller of claim 1, wherein the controller is configured to access a pool of programmable resources available to be provisioned and configured as the at least first and second new software-based network devices in the mesh network.

5. The controller of claim 1, wherein the controller is further configured to automatically:
determine to remove one or more existing software-based network devices from the mesh network; and
decommission the one or more existing software-based network devices.

6. The controller of claim 1, wherein the controller is configured to provision the at least first and second programmable resources as the at least first and second new software-based network devices using network function virtualization (NFV) and software-defined networking (SDN) technologies.

7. The controller of claim 1, wherein:
the controller is configured to automatically add the at least first and second new software-based network devices to the mesh network without interrupting existing communications being supported by the mesh network;
the controller is configured to automatically:
send test communication signals via the one or more new paths comprising at least one new software-based network device through the mesh network without interrupting the existing communications; and
allow the one or more new paths to support on-line communications after determining that transmission of the test communication signals was successful;
the controller is configured to access a pool of programmable resources available to be provisioned and configured as the at least first and second new software-based network devices in the mesh network;
the controller is further configured to automatically:
determine to remove one or more existing software-based network devices from the mesh network; and
decommission the one or more existing software-based network devices;
the controller is configured to provision the at least first and second programmable resources as the at least first and second new software-based network devices using NFV and SDN technologies;
the controller is configured to monitor the mesh network using SNMP technology; and
the controller is configured to configure the at least first and second software-based network devices using NETCONF technology.

8. A method for a network controller for a mesh network of network devices in a communication system, the network controller comprising a processor, storage, and memory configured to store program code for the processor, such that, when upon the processor ewes executing the program code, the processor implements (i) a controller core, (ii) a northbound API that enables the network controller to interact with a plurality of applications, (iii) a southbound API that enables the network controller to communicate with the network devices in the mesh network, (iv) the plurality of applications, and (v) an NFV orchestration, wherein the controller core automatically:
monitors, via the northbound API, the mesh network using a network management application to collect information about the network devices including existing configurations on the network devices and status of their interfaces to determine whether the mesh network has sufficient resources;
determines to add at least first and second new software-based network devices to the mesh network when upon the controller core determines determining that the mesh network has insufficient resources;
communicates, via the southbound API, with a commands application to download, from at least first and second different OEM libraries, at least first and second configuration protocols for at least first and second different programmable resources manufactured by the at least first and second different OEMs, respectively, on virtualized devices supervised by a virtualization module;

provisions, (i) using, via the southbound API, the network management application and a network configuration application and (ii) using the NFV orchestration, the at least first and second programmable resources to be the at least first and second new software-based network devices in the mesh network based on the at least first and second configuration protocols, respectively, to form an augmented mesh network; and configures, via the first API, the at least first and second new software-based network devices to support one or more new paths through the augmented mesh network.

9. The method of claim 8, wherein the controller automatically adds the at least first and second new software-based network devices to the mesh network without interrupting existing communications being supported by the mesh network.

10. The method of claim 9, wherein the controller automatically:

sends test communication signals via the one or more new paths comprising at least one new software-based network device through the mesh network without interrupting the existing communications; and allows the one or more new paths to support on-line communications after determining that transmission of the test communication signals was successful.

11. The method of claim 8, wherein the controller accesses a pool of programmable resources available to be provisioned and configured as the at least first and second new software-based network devices in the mesh network.

12. The method of claim 8, wherein the controller further automatically:

determines to remove one or more existing software-based network devices from the mesh network; and decommissions the one or more existing software-based network devices.

13. The method of claim 8, wherein the controller provisions the at least first and second programmable resources as the at least first and second new software- based network devices using NFV and SDN technologies.

14. The method of claim 8, wherein:

the controller automatically adds the at least first and second new software-based network devices to the mesh network without interrupting existing communications being supported by the mesh network;

the controller automatically:

sends test communication signals via the one or more new paths comprising at least one new software-based network device through the mesh network without interrupting the existing communications; and allows the one or more new paths to support on-line communications after determining that transmission of the test communication signals was successful;

the controller accesses a pool of programmable resources available to be provisioned and configured as the at least first and second new software-based network devices in the mesh network;

the controller is further automatically:

determines to remove one or more existing software-based network devices from the mesh network; and decommissions the one or more existing software-based network devices;

the controller provisions the at least first and second programmable resources as the at least first and second new software-based network devices using NFV and SDN technologies;

the controller monitors the mesh network using SNMP technology; and the controller configures the at least first and second software-based network devices using NETCONF technology.

15. A network controller for a mesh network of network devices in a communication system, the network controller comprising a processor, storage, and memory configured to store program code for the processor, such that, when upon the processor ewes executing the program code, the processor implements (i) a controller core, (ii) a northbound application programming interface (API) that enables the network controller to interact with a plurality of applications, (iii) a southbound API that enables the network controller to communicate with the network devices in the mesh network, (iv) the plurality of applications, and (v) a network function virtualization (NFV) orchestration, wherein the controller core is configured to automatically:

monitor, via the northbound API, the mesh network using a network management application to collect information about the network devices including existing configurations on the network devices and status of their interfaces to determine whether the mesh network has sufficient resources;

determine to add one or more new software-based network devices to the mesh network when upon the controller core determines determining that the mesh network has insufficient resources;

communicate, via the southbound API, with a commands application to download, from one or more original equipment manufacturer (OEM) libraries, one or more configuration protocols for one or more programmable resources manufactured by the one or more OEMs, respectively, on one or more virtualized devices supervised by a virtualization module;

provision, (i) using, via the southbound API, the network management application and a network configuration application and (ii) using the NFV orchestration, the one or more programmable resources to be the one or more new software-based network devices in the mesh network based on the one or more configuration protocols, respectively, to form an augmented mesh network; and configure, via the first API, the one or more new software-based network devices to support one or more new paths through the augmented mesh network.

16. The controller of claim 15, wherein the controller is configured to automatically add the one or more new software-based network devices to the mesh network without interrupting existing communications being supported by the mesh network.

17. The controller of claim 16, wherein the controller is configured to automatically:

send test communication signals via the one or more new paths comprising at least one new software-based network device through the mesh network without interrupting the existing communications; and allow the one or more new paths to support on-line communications after determining that transmission of the test communication signals was successful.

18. The controller of claim 15, wherein the controller is configured to access a pool of programmable resources available to be provisioned and configured as the one or more new software-based network devices in the mesh network.

19. The controller of claim 15, wherein the controller is further configured to automatically:
   determine to remove one or more existing software-based network devices from the mesh network; and
   decommission the one or more existing software-based network devices.

20. The controller of claim 15, wherein the controller is configured to provision the one or more programmable resources as the one or more new software-based network devices using network function virtualization (NFV) and software-defined networking (SDN) technologies.

21. The controller of claim 15, wherein at least one of the one or more new software-based network devices is a software-based router.

22. The controller of claim 15, wherein:
   the controller is configured to automatically add the one or more new software-based network devices to the mesh network without interrupting existing communications being supported by the mesh network;
   the controller is configured to automatically:
   send test communication signals via the one or more new paths comprising at least one new software-based network device through the mesh network without interrupting the existing communications; and
   allow the one or more new paths to support on-line communications after determining that transmission of the test communication signals was successful;
   the controller is configured to access a pool of programmable resources available to be provisioned and configured as the one or more new software-based network devices in the mesh network;
   the controller is further configured to automatically:
   determine to remove one or more existing software-based network devices from the mesh network; and
   decommission the one or more existing software-based network devices;
   the controller is configured to provision the one or more programmable resources as the one or more new software-based network devices using NFV and SDN technologies;
   the controller is configured to monitor the mesh network using SNMP technology;
   the controller is configured to configure the one or more software-based network devices using NETCONF technology; and
   at least one of the one or more new software-based network devices is a software-based router.

23. A method for a network controller for a mesh network of network devices in a communication system, the network controller comprising a processor, storage, and memory configured to store program code for the processor, such that, when upon the processor ewes executing the program code, the processor implements (i) a controller core, (ii) a northbound API that enables the network controller to interact with a plurality of applications, (iii) a southbound API that enables the network controller to communicate with the network devices in the mesh network, (iv) the plurality of applications, and (v) an NFV orchestration, wherein the controller core automatically:
   monitors, via the northbound API, the mesh network using a network management application to collect information about the network devices including existing configurations on the network devices and status of their interfaces to determine whether the mesh network has sufficient resources;
   determines to add one or more new software-based network devices to the mesh network when upon the controller core determines determining that the mesh network has insufficient resources;
   communicates, via the southbound API, with a commands application to download, from one or more OEM libraries, one or more configuration protocols for one or more programmable resources manufactured by the one or more OEMs, respectively, on one or more virtualized devices supervised by a virtualization module;
   provisions, (i) using, via the southbound API, the network management application and a network configuration application and (ii) using the NFV orchestration, the one or more programmable resources to be the one or more new software-based network devices in the mesh network based on the one or more configuration protocols, respectively, to form an augmented mesh network; and
   configures, via the first API, the one or more new software-based network devices to support one or more new paths through the augmented mesh network.

24. The method of claim 23, wherein the controller automatically adds the one or more new software-based network devices to the mesh network without interrupting existing communications being supported by the mesh network.

25. The method of claim 24, wherein the controller automatically:
   sends test communication signals via the one or more new paths comprising at least one new software-based network device through the mesh network without interrupting the existing communications; and
   allows the one or more new paths to support on-line communications after determining that transmission of the test communication signals was successful.

26. The method of claim 23, wherein the controller accesses a pool of programmable resources available to be provisioned and configured as the one or more new software-based network devices in the mesh network.

27. The method of claim 23, wherein the controller further automatically:
   determines to remove one or more existing software-based network devices from the mesh network; and
   decommissions the one or more existing software-based network devices.

28. The method of claim 23, wherein the controller provisions the one or more programmable resources as the one or more new software-based network devices using NFV and SDN technologies.

29. The method of claim 23, wherein at least one of the one or more new software-based network devices is a software-based router.

30. The method of claim 23, wherein:
   the controller automatically adds the one or more new software-based network devices to the mesh network without interrupting existing communications being supported by the mesh network;
   the controller automatically:
   sends test communication signals via the one or more new paths comprising at least one new software-based network device through the mesh network without interrupting the existing communications; and allows the one or more new paths to support on-line communications after determining that transmission of the test communication signals was successful;

the controller accesses a pool of programmable resources available to be provisioned and configured as the one or more new software-based network devices in the mesh network;

the controller is further automatically:

determines to remove one or more existing software-based network devices from the mesh network; and decommissions the one or more existing software-based network devices;

the controller provisions the one or more programmable resources as the one or more new software-based network devices using NFV and SDN technologies;

the controller monitors the mesh network using SNMP technology;

the controller configures the one or more software-based network devices using NETCONF technology; and at least one of the one or more new software-based network devices is a software-based router.

\* \* \* \* \*

UNITED STATES PATENT AND TRADEMARK OFFICE
CERTIFICATE OF CORRECTION

| | |
|---|---|
| PATENT NO. | : 11,646,935 B1 |
| APPLICATION NO. | : 17/540542 |
| DATED | : May 9, 2023 |
| INVENTOR(S) | : Saran Khalid |

It is certified that error appears in the above-identified patent and that said Letters Patent is hereby corrected as shown below:

In the Claims

At Column 13, Line 8, Claim 1, replace "when upon the processor ewes executing the program code," with ---upon the processor executing the program code,---.

At Column 13, Line 25, Claim 1, replace "when upon the controller core determines determining that the mesh network has insufficient resources;" with ---upon the controller core determining that the mesh network has insufficient resources;---.

At Column 14, Line 9, Claim 6, remove a space after "software-" in "software- defined networking (SDN) technologies.".

At Column 14, Line 47, Claim 8, replace "when upon the processor ewes executing the program code," with ---upon the processor executing the program code,---.

At Column 14, Line 62, Claim 8, replace "when upon the controller core determines determining that the mesh network has insufficient resources;" with ---upon the controller core determining that the mesh network has insufficient resources;---.

At Column 16, Line 13, Claim 15, replace "when upon the processor ewes executing the program code," with ---upon the processor executing the program code,---.

At Column 16, Line 31, Claim 15, replace "when upon the controller core determines determining that the mesh network has insufficient resources;" with ---upon the controller core determining that the mesh network has insufficient resources;---.

At Column 17, Line 57, Claim 23, replace "when upon the processor ewes executing the program code," with ---upon the processor executing the program code,---.

Signed and Sealed this
Thirtieth Day of April, 2024

Katherine Kelly Vidal
*Director of the United States Patent and Trademark Office*

CERTIFICATE OF CORRECTION (continued)
U.S. Pat. No. 11,646,935 B1

At Column 18, Line 5, Claim 23, replace "when upon the controller core determines determining that the mesh network has insufficient resources;" with ---upon the controller core determining that the mesh network has insufficient resources;---.